(12) United States Patent
Hu et al.

(10) Patent No.: US 8,819,192 B2
(45) Date of Patent: Aug. 26, 2014

(54) IDENTIFYING KEYBOARD INACCESSIBLE NODE ON WEB PAGE

(75) Inventors: Jie Hu, Shanghai (CN); Yang Liu, Shanghai (CN); Ling Luo, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 13/293,530

(22) Filed: Nov. 10, 2011

(65) Prior Publication Data

US 2012/0136974 A1 May 31, 2012

(30) Foreign Application Priority Data

Nov. 30, 2010 (CN) .......................... 2010 1 0565471

(51) Int. Cl.
*G06F 15/177* (2006.01)
(52) U.S. Cl.
USPC ......................................... 709/220; 709/228

(58) Field of Classification Search
CPC ................... G06F 17/30899; G06F 17/30896; G06F 17/30902; G06F 17/3089
USPC ........... 709/220, 228; 340/1.1–16.1; 710/104; 713/1; 717/100–178; 715/200–978
See application file for complete search history.

(56) References Cited

U.S. PATENT DOCUMENTS 7,584,194 B2 * 9/2009 Tuttle et al. ......................... 1/1
2008/0235789 A1 9/2008 Erwin et al.

* cited by examiner

*Primary Examiner* — Phuoc Nguyen
*Assistant Examiner* — Davoud Zand
(74) *Attorney, Agent, or Firm* — Steven L. Nichols; Van Cott, Bagley, Cornwall & McCarthy P.C.

(57) ABSTRACT

A method and apparatus for identifying a keyboard inaccessible node on a web page. The method may include acquiring all nodes in a DOM tree of the web page; identifying a mouse operable node among all the nodes; checking whether or not said mouse operable node is keyboard navigable and whether or not said mouse operable node is keyboard operable; and extracting the keyboard non-navigable node and the keyboard inoperable node as said keyboard inaccessible node.

20 Claims, 2 Drawing Sheets

IDENTIFYING KEYBOARD INACCESSIBLE NODE ON WEB PAGE

CROSS-REFERENCE TO RELATED APPLICATIONS

The present application claims the benefit under 35 U.S.C. §119(e) of Chinese Application No. 201010565471.9, filed Nov. 30, 2010. This application is herein incorporated by reference in its entirety.

BACKGROUND

The present application relates to the presentation of web pages on a display device. Particularly, the present application relates to technology of node information identification on web pages.

In order to make web page applications accessible, operable elements such as buttons, text input, and links, on the web page should be keyboard navigable and associated with both mouse events and keyboard events. The mouse events may include, for example, pressing and releasing a determination button and option button or a rolling operation of a middle button. Keyboard events may include a press and a release of respective keys of a keyboard. During an Accessibility Verification Test (AVT), one method may include identifying mouse operable elements and then verifying whether those mouse operable elements are keyboard navigable and have been associated with related keyboard events.

SUMMARY

According to one aspect of the present application, there is provided a method of identifying keyboard inaccessible nodes on a web page, comprising: acquiring all nodes in the structural tree of the web page; identifying mouse operable nodes among all the nodes; checking whether the mouse operable nodes are keyboard navigable or not and keyboard operable or not; and extracting keyboard non-navigable nodes and keyboard inoperable nodes as the keyboard inaccessible nodes.

According to another aspect of the present application, there is provided an apparatus for identifying keyboard inaccessible nodes on a web page, comprising: an acquiring unit that acquires all nodes in the structural tree of the web page; a first identification unit that identifies mouse operable nodes among all the nodes; a second identification unit that checks whether the mouse operable nodes are keyboard navigable or not and keyboard operable or not; and a determination unit that extracts keyboard non-navigable nodes and keyboard inoperable nodes as the keyboard inaccessible nodes.

With the method and apparatus of the present application, the elements which are keyboard non-navigable and keyboard inoperable within the web pages may be determined more accurately by operating and detecting a Document Object Model (DOM) generated in computer data storage directly after the web pages have been generated. This is done so as to realize the detection of any nodes having events, thereby developing the efficiency and accuracy of web page design.

BRIEF DESCRIPTION OF THE SEVERAL VIEWS OF THE DRAWINGS

These and/or other aspects and advantages of the present disclosure will become more distinct and more easier to be understood from a detailed description of embodiments of the present disclosure in combination with attached drawings, in which.

Throughout the drawings, identical reference numbers designate similar, but not necessarily identical, elements.

DETAILED DESCRIPTION

Figure 1:
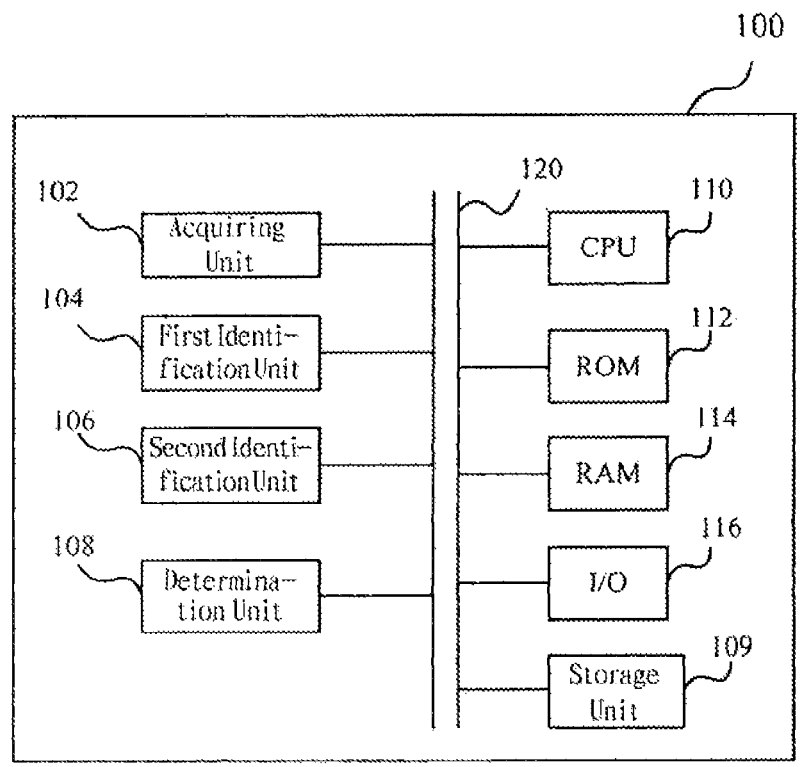
FIG. 1 is a block diagram showing an apparatus for identifying keyboard inaccessible nodes on a web page according to an embodiment of the present application.

Web King is a tool that can analyze static web pages, collect mouse operable objects, and then check whether they have related keyboard events. Web King is a tool for scanning static codes of web pages that examines, by scanning operable labels stated in the static codes such as <button> and <input>, whether the code includes the related events.

With Web 2.0 technologies, extensive and dynamic JavaScript is used on the web pages. Many elements on the web pages are dynamically generated. Although they can be customized to be mouse operable, they are not standard HyperText Markup Language (HTML) operable elements such as <div> or <span>. Additionally, some events are bound to the elements programmatically rather than defined as explicit attributes to the elements. For example, the dojo.connect function within DOJO TOOLKIT® (by the Dojo Foundation) can connect events to elements programmatically. In Web 2.0 especially, the nodes may not include operable labels such as <button> and <input> in a traditional sense and may instead use any HTML node labels such as <div> or <span>.

Further, the events of nodes may be loaded dynamically through JavaScript when the web pages are generated rather than written when the source code is written. Even for traditional operable labels, the events may be dynamically mounted when individual web pages are generated. Consequently, with the above mentioned scan tools scanning the static codes, it is not possible to detect the keyboard and mouse events of such nodes before the individual web pages are generated. For these new situations, the existing static analysis tools for standard HTML operable elements will not work to detect these types of keyboard and mouse events.

Currently, most of analysis work is done manually in light of the above reason. AVT testers operate all elements within the web pages via mouse and keyboard manually and then get a list of elements which are keyboard non-navigable or lack of the related keyboard events. This is often time consuming and error prone.

In the following, specific embodiments of the present application will be described in detail with reference to attached drawings. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the present specification and in the appended claims, the term "keyboard inaccessible node" is meant to be understood broadly as any node or nodes on a web page which is incapable of being accessed by keyboards, and includes keyboard non-navigable nodes and keyboard inoperable nodes.

Additionally, in the present specification and in the appended claims, the term "keyboard non-navigable node" is meant to be understood broadly as any node or nodes that can not be interacted with, i.e., on which valid cursor focuses cannot be obtained, using any number of keystrokes on a keyboard. Therefore, in one example a keyboard non-navigable node is a node that cannot be interacted with, i.e., on which a cursor focus cannot be obtained, using triggering keys such as <tab>, <up>, <down>, <left>, <right>, on a keyboard. In another example, a keyboard non-navigable node is a node that cannot be interacted with because it has a keyboard "disable" attribute associated with it.

Further, in the present specification and in the appended claims, the term "keyboard inoperable node" is meant to be understood broadly as any node or nodes which cannot cause the state of a web page to change in response to issuing of keyboard events.

Still further, in the present specification and in the appended claims, the term "mouse operable node" is meant to be understood broadly as any node or nodes which may cause the state of a web page to change in response to the issuance of mouse events.

FIG. 1 is a block diagram showing an apparatus for identifying keyboard inaccessible nodes on a web page according to an embodiment of the present disclosure. As shown in FIG. 1, the apparatus (100) for identifying keyboard inaccessible nodes on a web page according to one embodiment of the present disclosure includes: an acquiring unit (102) that acquires all nodes in the structural tree of a web page; a first identification unit (104) that identifies mouse operable nodes in all the nodes; a second identification unit (106) that checks whether the mouse operable nodes are keyboard navigable or not and keyboard operable or not; and a determination unit (108) that extracts keyboard non-navigable nodes and keyboard inoperable nodes as the keyboard inaccessible nodes. In one embodiment, checking whether the mouse operable nodes are keyboard navigable and keyboard operable may mean that a node can be checked simultaneously to determine whether it is keyboard navigable or not and whether it is keyboard operable or not. For a keyboard non-navigable node, it may be labeled as "keyboard non-navigable" in the output result. For a keyboard inoperable node, it may be labeled as "keyboard inoperable" in the output result.

In another example, checking whether the mouse operable nodes are keyboard navigable and keyboard operable may also mean that a node is checked first to determine whether it is keyboard navigable (or keyboard operable) and then the node is further checked to determine whether it is keyboard operable (or keyboard navigable). A keyboard non-navigable node may be labeled as "keyboard non-navigable" in the output result and a keyboard inoperable node may be labeled as "keyboard inoperable" in the output result.

In addition, the apparatus (100) according to the present disclosure may further include: a central processing unit (CPU) (110) for executing related programs to process various data and control operations of respective units in the apparatus (100); a read only memory (ROM) (112) for storing various programs required for the CPU (110) to perform various process and control; a random access memory (RAM) (114) for storing intermediate data produced temporarily by the CPU (110) in the procedure of process and control; an input/output (I/O) unit (116) for transmitting and receiving various commands and data and so on to and from external devices; and a storage unit (109) for storing various programs and resultant data and so on in nonvolatile fashion. The acquiring unit (102), first identification unit (104), second identification unit (106), determination unit (108), storage unit (109), CPU (110), ROM (112), RAM (114), and I/O unit (116) may be connected via a data and/or command bus (120) and may transmit signals amongst the various components above.

The respective units as described above do not limit the scope of the present disclosure. According to one embodiment of the present disclosure, the function of any one of the acquiring unit (102), first identification unit (104), second identification unit (106) and determination unit (108) may also be realized through functional software in combination with the CPU (110), ROM (112), RAM (114), I/O unit (116).

In the following, specific operations of respective units in the apparatus (100) according to the present disclosure will be described in more detail. The acquiring unit (102) may acquire a number of nodes within the structural tree of a web page. In this example, the structural tree may be the DOM (Document Object Model) tree in the web page which may include various content used to describe the web page and its name, IDs, and attributes, and which is divided into multiple nodes. The DOM tree is provided by a provider and can act as an HTML programming interface. The acquiring unit (102) parses the DOM tree, acquires a number of nodes therein, and collects the nodes into a list. These nodes may include mouse operable elements such as any one of text input, buttons, and links amongst others, and may further include mouse inoperable elements such as any one of paragraphs, text messages, and labels, amongst others.

The first identification unit (104) identifies the mouse operable nodes among the nodes of the structural tree. Specifically, the first identification unit (104) simulates mouse events on each node (to be described later) and monitors whether the web page state changes or not. The first identification unit (104) also listens to the result when simulating mouse events on each node. Changes of a web page state include any one of a structural change of the DOM tree, request sending, and opening of a new browser window among others. For a mouse operable node, there must be change of the web page state as the result of a mouse event. After the change has been detected, the mouse operable node is labeled. Specifically, the first identification unit (104) simulates the mouse events on respective nodes in the number of nodes, judges whether the web page state changes or not, and identifies as mouse operable nodes those nodes for which the web page state changes.

The second identification unit (106) checks whether these mouse operable nodes are keyboard navigable or not and keyboard operable or not. Specifically, according to one embodiment of the present specification, for a certain mouse operable node, the second identification unit (106) may firstly check whether the node is keyboard navigable or not. The second identification unit (106) can utilize a currently known method for identifying keyboard non-navigable nodes on the web page. For example, the <tab> key or the <up>, <down>, <left>, <right> moving keys are triggered to obtain a cursor focus, and keyboard non-navigable nodes are identified based on whether the cursor focus on the mouse operable nodes is valid or not. Alternatively, keyboard non-navigable nodes are identified among the mouse operable nodes by scanning attributes of respective nodes, for example, checking the "disable" attribute or "tabindex" attribute of the nodes. If the identification result is that the nodes are keyboard non-navigable, the second identification unit (106) may label the identified nodes as "keyboard non-navigable." The second identification unit (106) may also output the nodes which are identified as "keyboard non-navigable" as a first result. The nodes which are identified as "keyboard non-navigable" are a subset of the final result set. The nodes in the subset may be stored in for example the storage unit (109).

The second identification unit (106) may further judge whether the nodes are keyboard operable or not. Specifically, the second identification unit (106) simulates the keyboard events on the mouse operable nodes (to be described later), and monitors changes of the web page state. Specifically, the second identification unit (106) simulates the keyboard events on the mouse operable nodes, and judges whether the web page state changes in the keyboard events or not. If the web page state changes in the keyboard events, the second identification unit (106) may label such nodes as compliant nodes (keyboard operable nodes). The nodes for which the web page state does not change in the keyboard events may be labeled as "keyboard inoperable" nodes. The second identification unit (106) may output the nodes which are labeled as "keyboard inoperable" as a second result. These nodes are also a subset of the final result set. The nodes in the subset may be stored in the storage unit (109).

According to another embodiment of the present disclosure, the second identification unit (106) may also initially check whether a certain node is keyboard operable (the specific process is as described above). If it is found that the node is keyboard inoperable, the node is labeled as "keyboard inoperable" and it is output as the result. Then, it is further checked whether the node is keyboard navigable or not. When the further check results in a keyboard non-navigable node being detected then the node is labeled as "keyboard non-navigable," and it is output as the result. Checks for the same node include checks of both whether keyboard navigable or not and whether keyboard operable or not.

As described above, a node may also be checked to determine simultaneously whether it is keyboard navigable or not and keyboard operable or not. In such a case, when the check results of the node are not only keyboard non-navigable but also keyboard inoperable, the node may be labeled as "keyboard non-navigable" and "keyboard inoperable," and the node with the two labels is output as the results. Alternatively, if only one of the results is negative, that is, the result is either keyboard non-navigable or keyboard inoperable, the node may be labeled as "keyboard non-navigable" or "keyboard inoperable," and it is output as the result.

The result obtained through the above process, i.e. the node with the label or labels of "keyboard non-navigable" and/or "keyboard inoperable", can be generated as a node list or arranged in other forms. The node list or the other forms may be stored in the storage unit (109). These nodes stored in the storage unit (109) may, be output to external devices such as displaying devices, printing devices or speakers via the I/O unit (116) to notify the user of the results. In one example, the node with the label or labels of "keyboard non-navigable" and/or "keyboard inoperable" obtained through the above process may not be stored in the storage unit (109) and instead may be directly output to the external devices such as displaying devices, printing devices or speakers amongst others via the I/O unit (116) and so on to notify the user of the result.

Simulations for a mouse event and a keyboard event refer to programmatically building a mouse event and/or a keyboard event of each node. Some examples of events may include the events of on KeyPress, on MouseMove, on DoubleClick, amongst others. Under the architecture of DOM tree, the event is dispatched and triggered on the node of the DOM tree. If the node is mouse operable or keyboard operable, the corresponding web page state will change in response to the triggering of the event as described above. Therefore, the node of the DOM tree may be identified to determine whether it is mouse operable or not and keyboard operable or not by monitoring whether the web page state changes or not.

A specific code example of Javascript for simulating that a mouse clicks one node object is shown as follows:

```
function simulateClick (var node) {
    var evt = document.createEvent("MouseEvents");
    evt.initMouseEvent("click", true, true, window,
        0, 0, 0, 0, 0, false, false, false, false, 0, null);
    node.dispatchEvent(evt);}
```

The determination unit (108) extracts the keyboard non-navigable nodes output as the first result as well as the nodes for which the web page state does not change in the keyboard events (keyboard inoperable nodes) output as the second result. The determination unit (108) also combines the two result sets into the final result set of identification results for keyboard inaccessible nodes.

Figure 2:
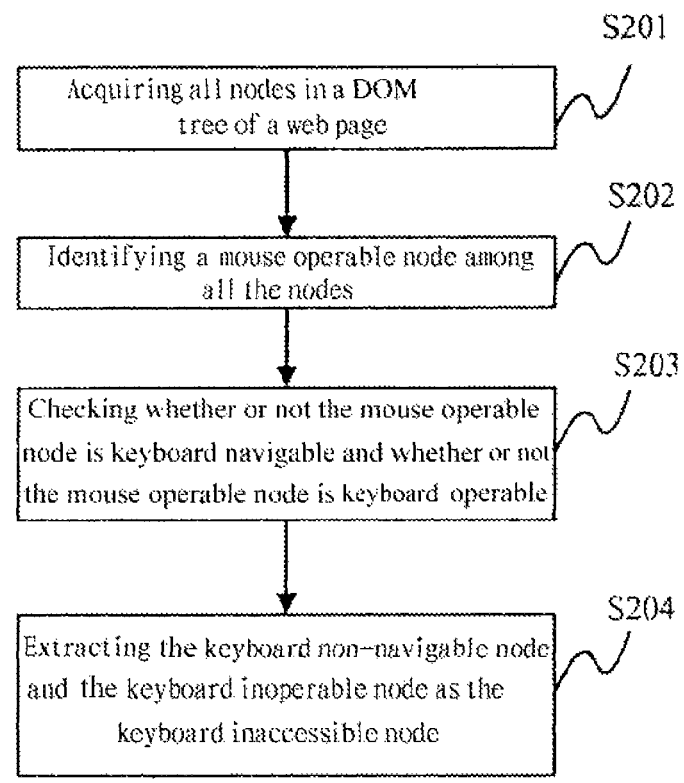
FIG. 2 is a flowchart showing a method of identifying keyboard inaccessible nodes on a web page according to another embodiment of the present application.

FIG. 2 is a flowchart showing a method of identifying keyboard inaccessible nodes on a web page according to another embodiment of the present disclosure. As shown in FIG. 2, the method of identifying keyboard inaccessible nodes on a web page or number of web pages according to the present disclosure includes acquiring (S201) all or a number of nodes in the structural tree of a web page). The mouse operable nodes among all the nodes may then be identified (S202). All the mouse operable nodes are checked (S203) to determine whether they are keyboard navigable or not and keyboard operable or not. The keyboard non-navigable nodes and the keyboard inoperable nodes are extracted as the keyboard inaccessible nodes.

Acquiring (S201) all or a number of nodes in the DOM tree of a web page can be accomplished by the acquiring unit (102) in FIG. 1. Identifying (S202) a mouse operable node among all the nodes can be accomplished by the first identification unit (104) in FIG. 1. Checking (S203) whether or not the mouse operable mode is keyboard navigable and whether or not the mouse operable node is keyboard operable can be accomplished by the second identification unit (106) in FIG. 1. Extracting (S204) the keyboard non-navigable node and the keyboard inoperable node as the keyboard inaccessible node can be accomplished by the determination unit (108) in FIG. 1.

Figure 3:
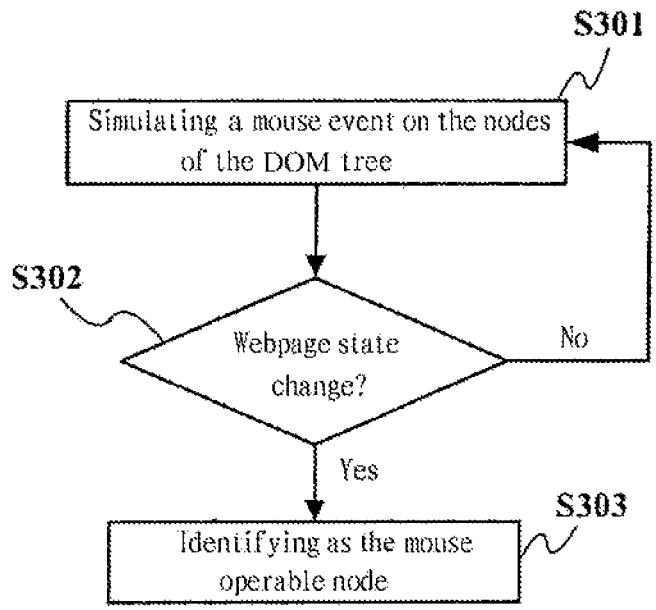
FIG. 3 is a flowchart showing a method of identifying mouse operative nodes on a web page according to another embodiment of the present application.

FIG. 3 is a flowchart showing a method of identifying mouse operative nodes on a web page according to another embodiment of the present application. As shown in FIG. 3, identifying (FIG. 2, S202) the mouse operable nodes among all the nodes may further include simulating (S301), on respective nodes among a number of nodes, a mouse event on the nodes of the DOM tree. It is then determined (S302) whether the web page state changes or not. If it has been determined that the web page state has changed (S302, Determination YES), the mouse operable node is identified (S303). If it has been determined that the web page state has not changed (S302, Determination NO) the process continues to simulate (S301) the mouse events on the next node until identification of all the nodes is finished. The above process of FIG. 3 can be accomplished by the first identification unit (104) in FIG. 1.

Figure 4:
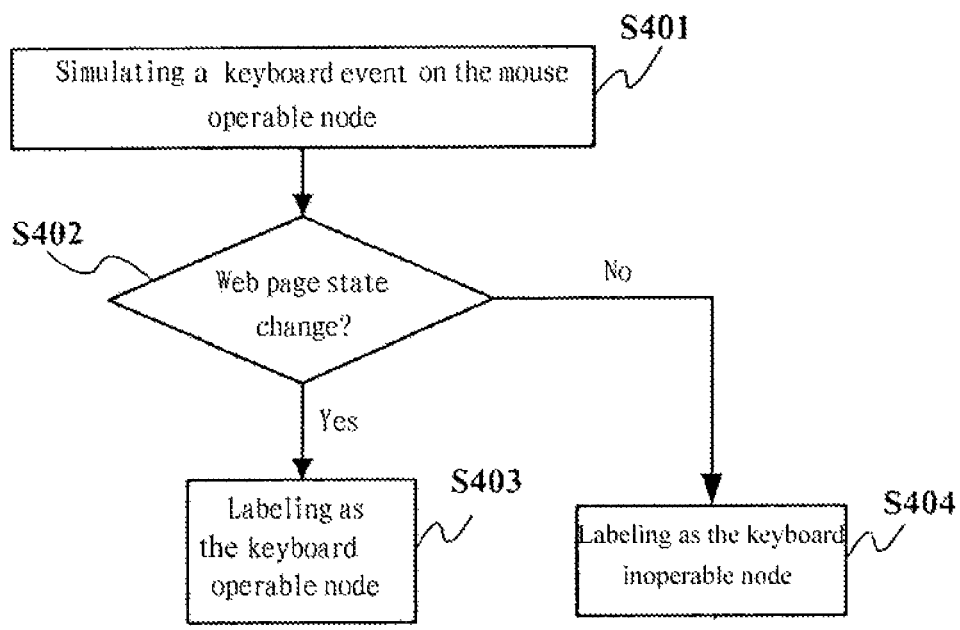
FIG. 4 is a flowchart showing a method of checking whether or not the mouse operable node is keyboard navigable and whether or not the mouse operable node is keyboard operable according to another embodiment of the present application.

FIG. 4 is a flowchart showing a method of checking whether or not the mouse operable node is keyboard navigable and whether or not the mouse operable node is keyboard operable according to another embodiment of the present application. As shown in FIG. 4, checking (FIG. 2, S203) whether or not the mouse operable node is keyboard navigable and whether or not the mouse operable node is keyboard operable may further include simulating (S401) keyboard events on the mouse operable nodes. It is then determined (S402) whether the web page state changes or not in the keyboard events. If it is determined that the web page state does change in the keyboard events (S402, Determination YES), the nodes may be labeled as the keyboard operable nodes. If it is determined that the web page state does not change in the keyboard events (S402, Determination NO), the nodes for which the web page state does not change are labeled as the keyboard inoperable nodes.

The above process of FIG. 4 can be accomplished by the second identification unit (106) in FIG. 1.

In the above methods of the present application, the changes of a web page may include any one of the change of the structural tree, request sending, and opening of a new browser window. In the above methods of the present application, the nodes may include any one of text input, buttons, links, paragraphs, text messages and labels, and the mouse operable nodes may include any one of text input, buttons and links.

Since the nodes of the present disclosure are nodes obtained by analyzing the DOM tree, the output list of keyboard inaccessible nodes may include node information such as node types, names, IDs, attributes, among others. This may better allow developers to locate elements and fix them in the source codes.

Furthermore, the apparatus and method as described in the present application cover all mouse operable elements, including not only standard HTML mouse operable elements but also other HTML elements which are attached statically with the mouse events and not supported by the existing accessibility analyzing tools.

The embodiments of the present application may be implemented by hardware, software and firmware or combinations thereof. Additionally, the way of implementation does not limit the scope of the present disclosure. For example, the present disclosure may be realized by executing software programs according to the disclosure in a general computer system.

The embodiments of the present disclosure may be implemented by plug-ins of web page browsers, such as FIREFOX® (by Mozilla Corporation) extension, INTERNET EXPLORER® (by Microsoft) plug-ins or the like, thus significantly simplifying a DOM tree analyzing and manipulating web pages.

The above embodiments of the present application are only exemplary descriptions, and their specific structures and operations do not limit the scope of the disclosure. Those skilled in the art can combine different parts and operations of the above respective embodiments to produce new implementations which equally accord with the conception of the present disclosure.

The connection relationships between respective functional elements (units) in the embodiments of the present application do not limit the scope of the present disclosure, in which one or multiple functional element(s) or unit(s) may contain or be connected to any other functional elements or units.

Although several embodiments of the present disclosure have been shown and described in combination with attached drawings above, those skilled in the art should understand that variations and modifications which still fall into the scope of claims and their equivalents of the present disclosure can be made to these embodiments without departing from the principle and spirit of the disclosure.

What is claimed is:

1. A method of identifying a keyboard inaccessible node on a web page, comprising:
    acquiring all nodes in a document object model (DOM) tree of the web page;
    identifying a mouse operable node among all the nodes, identifying a mouse operable node among all the nodes comprising:
        simulating a mouse event on each node among all the nodes;
    checking if said mouse operable node is keyboard navigable and if said mouse operable node is keyboard operable; and
    extracting a number of keyboard non-navigable nodes and number of keyboard inoperable nodes as keyboard inaccessible nodes.

2. The method according to claim 1, in which identifying a mouse operable node among all the nodes further comprises:
    determining if the web page state changes; and
    identifying a node for which the web page state changes as the mouse operable node.

3. The method according to claim 1, in which checking if said mouse operable node is keyboard operable further comprises:
    simulating a keyboard event on the mouse operable node;
    determining if the web page state changes; and
    identifying a node for which the web page state does not change as one of the number of keyboard inoperable nodes.

4. The method according to claim 1, further comprising:
    labeling the number of keyboard non-navigable nodes as "keyboard non navigable", and labeling the number of keyboard inoperable nodes as "keyboard inoperable".

5. The method according to claim 2, in which the changes of said web page state comprises changes of the DOM tree, request sending, opening of a new browser window, or combinations thereof.

6. The method according to claim 3, in which the changes of said web page state comprises changes of the DOM tree, request sending, opening of a new browser window, or combinations thereof.

7. The method according to claim 1, in which the step of checking if said mouse operable node is keyboard navigable and if said mouse operable node is keyboard operable further comprises first checking if it is keyboard navigable.

8. The method according to claim 1, in which the step of checking if said mouse operable node is keyboard navigable and if said mouse operable node is keyboard operable further comprises first checking if it is keyboard operable.

9. The method according to claim 1, in which said all nodes comprise any one of text input, buttons, links, paragraphs, text information and labels, and said mouse operable node comprises any one of text input, buttons and links.

10. An apparatus for identifying a keyboard inaccessible node on a web page, comprising:
    an acquiring unit to acquire all nodes in a document object model (DOM) tree of the web page;

a first identification unit to identify a mouse operable node among all the nodes, in which the first identification unit identifies a mouse operable node among all the nodes by simulating a mouse event on each node among all the nodes;

a second identification unit to check if said mouse operable node is keyboard navigable and if said mouse operable node is keyboard operable; and a determination unit to determine whether the mouse operable node is a keyboard non-navigable node and determine whether the mouse operable node is a keyboard inoperable node, and if so, extract the keyboard non-navigable node and keyboard inoperable node as said keyboard inaccessible node.

11. The apparatus according to claim 10, in which the first identification unit, after simulating a mouse event on each node among all the nodes, further identifies a node for which the web page state changes in the mouse event as the mouse operable node.

12. The apparatus according to claim 10, in which the second identification unit simulates a keyboard event on said mouse operable node and identifies a node for which the web page state does not change in the keyboard event as one of the number of keyboard inoperable nodes.

13. The apparatus according to claim 10, in which the second identification unit labels the number of keyboard non-navigable nodes as "keyboard non-navigable" and labels the number of keyboard inoperable nodes as "keyboard inoperable".

14. The apparatus according to claim 11, in which the changes of said web page state comprises a change of the DOM tree, request sending, opening of a new browser window, or combinations thereof.

15. The apparatus according to claim 12, in which the changes of said web page state comprises a change of the DOM tree, request sending, opening of a new browser window, or combinations thereof.

16. The apparatus according to claim 10, in which the second identification unit first checks if it is keyboard navigable.

17. The apparatus according to claim 10, in which the second identification unit first checks if it is keyboard operable.

18. The apparatus according to claim 10, in which said all nodes comprise any one of text input, buttons, links, paragraphs, text information and labels, and said mouse operable node comprises any one of text input, buttons and links.

19. A method of identifying a keyboard inaccessible node on a web page, comprising:
   detecting a number of nodes within a document object model (DOM tree of the web page;
   identifying a mouse operable node among the detected nodes by simulating a mouse event on each of said number of nodes within the DOM tree and determining whether the web page state has changed upon operation of the simulation;
   determining if said mouse operable node is keyboard navigable and if said mouse operable node is keyboard operable; and
   defining keyboard non-navigable nodes and keyboard inoperable nodes as said keyboard inaccessible node.

20. A method of identifying a keyboard inaccessible node on a web page, comprising:
   detecting a number of nodes within a document object model (DOM) tree of the web page;
   identifying a mouse operable node among the detected nodes;
   determining if said mouse operable node is keyboard navigable and if said mouse operable node is keyboard operable by simulating a keyboard event on each of a number of mouse operable nodes within the DOM tree and determining whether the web page state has changed upon operation of the simulation; and
   defining keyboard non-navigable nodes and keyboard inoperable nodes as said keyboard inaccessible node.

* * * * *